June 10, 1941.                J. L. WOODWORTH                2,245,242
                 CARRIER CURRENT CONTROL TRANSMITTER SYSTEM
                         Filed June 1, 1940
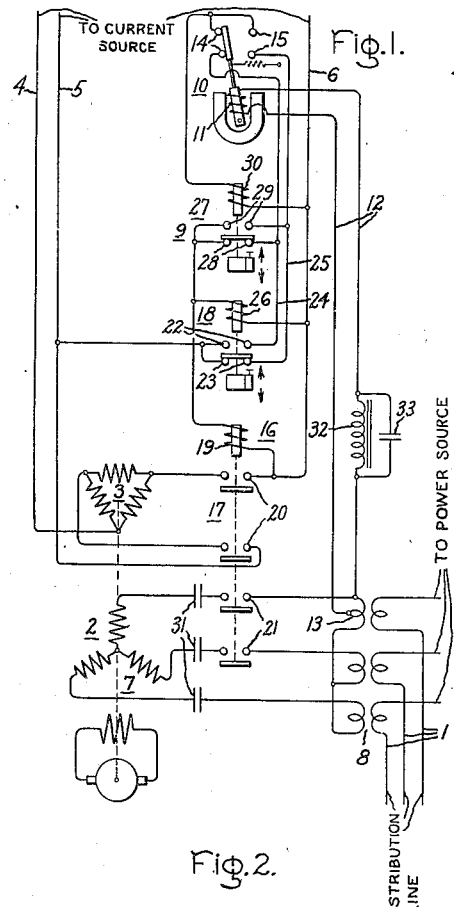
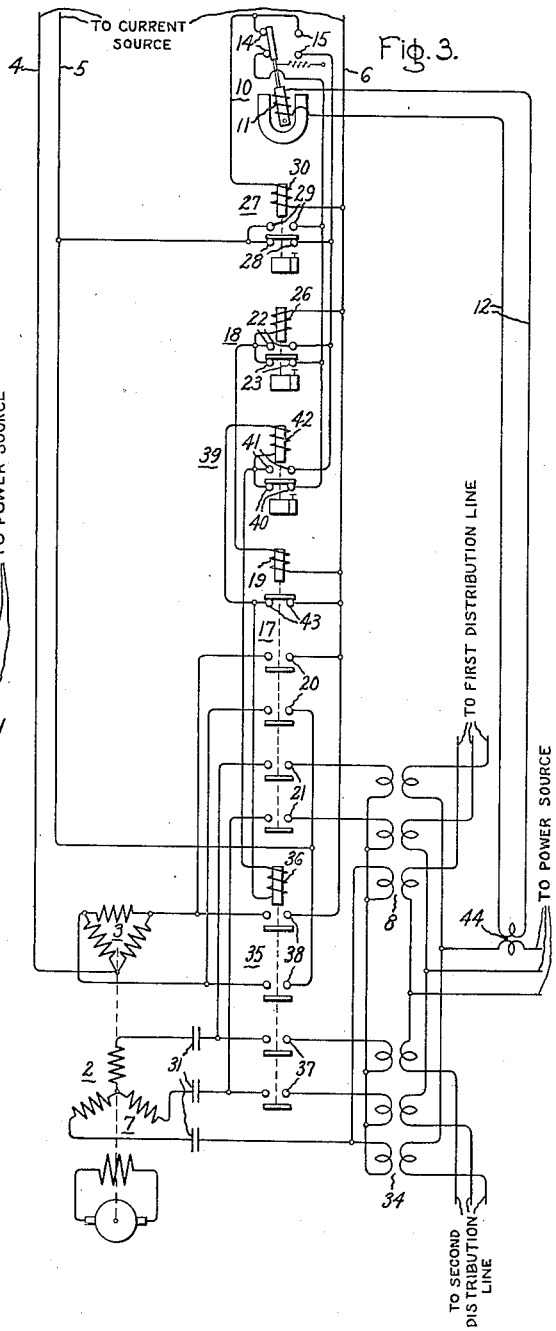
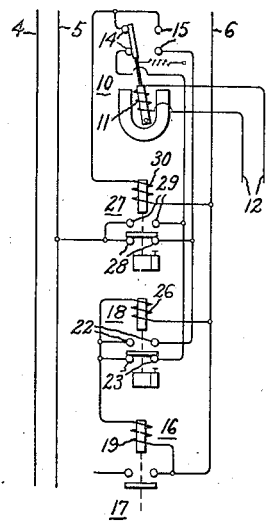
Inventor:
John L. Woodworth,
by Harry E. Dunlap
His Attorney.

Patented June 10, 1941

2,245,242

UNITED STATES PATENT OFFICE 2,245,242

CARRIER CURRENT CONTROL TRANSMITTER SYSTEM

John L. Woodworth, Schenectady, N. Y., assignor to General Electric Company, a corporation of New York Application June 1, 1940, Serial No. 338,362

6 Claims. (Cl. 171—97)

My invention relates to carrier-current systems, particularly to carrier-current control transmitters for supplying carrier-current impulses to electric lines or distribution networks, for the control, for example, of off-peak loads such as water heaters at remote points on the network.

The general object of my invention is the provision of an improved automatically operating carrier-current control transmitter arrangement for the above-mentioned and like uses.

In accordance with my invention this object is accomplished by the provision of a carrier-current control transmitter arrangement comprising means for initiating the operation, and controlling the time period of operation, of generating means for supplying the carrier-current impulses to the distribution lines in response to load conditions thereon, and means associated with the load responsive means to delay for a predetermined period the initiation of the carrier current impulses, thereby to obviate irregular or other undesired operation of the system.

The novel features which are considered to be characteristic of my invention are set forth with particularity in the appended claims. My invention itself, however, both as to its organization and method of operation together with further objects and advantages thereof may best be understood by reference to the following description taken in connection with the accompanying drawing, Fig. 1 of which is a diagrammatic representation of a carrier-current system embodying my invention, Fig. 2 illustrates a slightly different connection arrangement for the carrier-current system of Fig. 1, and Fig. 3 is a diagrammatic representation of a system similar to that illustrated in Figures 1 and 2 but adapted to the supplying of carrier current to two distribution lines consecutively.

Referring to Fig. 1, the numeral 1 designates an electric line which may form part of a distribution system or network operating at a usual commercial frequency, as 60 cycles per second. This system may carry usual loads of varying amount connected to the power source continuously and also may carry off-peak loads, such as water heaters, adapted to be disconnected from the power source during peak or overload periods, or periods of heavy load above a predetermined amount, and to be reconnected thereto during underload periods.

The numeral 2 designates a carrier-current generating means, which may include a motor 3, adapted to be connected to a suitable current source (not shown) through leads 4 to 6, and a generator 7 adapted to be coupled to line 1 by a suitable coupling means such as a coupling transformer 8 for supplying carrier-current impulses to the line at a desired frequency, for example, 720 cycles per second. These impulses may be utilized in a usual manner through suitable carrier-current responsive means (not shown) at a remote station on the line to control, automatically, the connection to the line of a water heater (not shown) or like temporary load.

The numeral 9 designates a carrier-current transmitter in accordance with my invention for controlling in response to load conditions on line 1 the initiation of operation of the carrier-current generating means 2 included in the transmitter apparatus, and the length of the time intervals during which the generating means is connected to the line.

The transmitter 9 comprises a switch or relay means or like device 10 having an actuating winding 11 energized in accordance with load conditions on line 1 preferably by connection of the winding through leads 12 to a winding 13 of coupling transformer 8, contacts 14 adapted to be closed under overload or heavy load conditions above a predetermined amount, on the line 1, and contacts 15 adapted to be closed under predetermined underload conditions on the line.

The transmitter 9 further comprises a switch means 16, which includes a motor generator control switch 17 and a time switch, or relay, 18 associated therewith. The motor generator switch 17 is provided with an actuating winding 19, the energizing means for which will be described hereinafter, contacts 20 adapted to control the connection of the motor 3 to the current source, and contacts 21 adapted to control the connection of the generator 7 to the coupling transformer 8. The time switch, or relay, 18 is provided with contacts 22 and 23 both connected to one of the current source leads, as 5, and in series respectively through leads 24 and 25 with heavy load and underload contacts 14 and 15 of load responsive switch means 10. The time switch or relay 18 is also provided with an actuating winding 26 the energizing means for which will be described presently.

The transmitter 9 further includes a time switch or relay means 27, adapted to delay the energizing of the actuating winding 19 of motor generator switch 17 and of the actuating winding 26 of the time switch 18. For this purpose the time switch 27 is provided with contacts 28 and 29 both connected to the paralleled actuating windings 19 and 26 and in series respectively with contacts 22 and 23 of time switch 18. The time switch 27 further includes an actuating winding 30 connected in series with contacts 14 and 15 of load responsive switch means 10. Actuating windings 30, 26, and 19, of switch means 27, 18 and 17 respectively, are all connected to a lead 6 of the generating means supply source.

The total cycles or total time periods of the time switch means 18 and 27, respectively, may be approximately 50 seconds and ten minutes. In one cycle of time switch 18 the contacts preferably reverse after ten seconds and again at the end of the cycle. Time switch 27, if energized continuously, is so arranged that it reverses its contacts after five minutes. For both time switches, however, the time periods of the contact operations are preferably adjustable over a wide range to meet particular conditions.

Referring to the circuits involving actuating winding 30 of time switch 27, one circuit includes lead 6 of the current source, the actuating winding 30, overload or heavy load contacts 14 of load responsive switch 10, contacts 22 of time switch 18, and lead 5 of the current source. The other circuit includes current source lead 6, the actuating winding 30, underload contacts 15 of load responsive switch means 10, contacts 23 of time switch 18, and current source lead 5.

Referring to the circuits involving the actuating winding 19 of the motor generator switch 17, one of these circuits includes current source lead 6, the actuating winding 19, contacts 28 of time switch 27, contacts 22 of time switch 18, and current source lead 5. The other circuit includes current source lead 6, the actuating winding 19, contacts 29 of time switch 27, contacts 23 of time switch 18, and current source lead 5.

Referring to the circuits involving actuating winding 26 of time switch 18, one of these circuits includes current source lead 6, the actuating winding 26, contacts 28 of time switch 27, contacts 22 of time switch 18, and current source lead 5. The other circuit includes current source lead 6, the actuating winding 26, contacts 29 of time switch 27, contacts 23 of time switch means 18, and current source lead 5.

In the embodiment of my invention illustrated in Fig. 1 the coupling transformer 8 operates to supply carrier current at 720 cycles per second through blocking capacitors 31 to the power line 1 from generator 7 as well as to supply energizing current at 60 cycles per second from the power line 1 to the actuating winding 11 of load responsive relay 10. Coupling transformer 8 is in series resonance connection with the blocking capacitors 31 which are in series with the generator 7. A relatively high voltage at carrier frequency therefore appears across winding 13 of the coupling transformer 8. Under some conditions this high carrier voltage may adversely affect the calibration of relay 10. To prevent this result it is desirable to provide a wave trap, in the circuit of transformer winding 13 and relay winding 11, comprising an inductance 32 and a capacitor 33 in parallel resonance connection. The wave trap prevents the 720 cycle carrier current from flowing in the circuit including relay winding 11 but permits the 60 cycle line current to flow in this circuit through the inductance element 32.

Instead of energizing actuating winding 11 of relay 10 by connection to a winding 13 of coupling transformer 8 as shown in the drawing, a separate current transformer (not shown) associated with the power line 1 in a usual manner may be employed. In this case the trap circuit 32, 33 would not be required because the current transformer would not function as part of the above-mentioned resonant circuit including blocking capacitors 31, and, therefore, the high carrier voltage would not be impressed on the current transformer.

In operation, let it be assumed that the various switch means of the carrier-current control transmitter 9 are initially in their illustrated positions. The positions illustrated are those corresponding to a continuing condition of overload or heavy load on line 1. During the condition of overload or heavy load, contacts 14 of the load responsive switch means 10 are in closed position and underload contacts 15 are open, the switch 10 being maintained in this position by the current in winding 11 which is supplied from coupling transformer winding 13 and which corresponds to the relatively heavy load on line 1. Contacts 20 and 21 of motor generator switch 17 are open, thereby maintaining motor 3 disconnected from its current source and generator 7 disconnected from the coupling transformer 8. Contacts 23 and 28 of switch means 18 and 27 respectively are in closed position and contacts 22 and 29 are open. One of the circuits of the paralleled actuating windings 19 and 26 although closed at contacts 23 of switch 18 is open at contacts 29 of switch means 27, and the other circuit of paralleled windings 19 and 26 although closed at contacts 28 of switch 27 is open at contacts 22 of switch 18. Likewise one of the circuits of actuating winding 30 although closed at contacts 14 of load responsive switch 10 is open at contacts 22 of switch 18, and the other circuit of winding 30 although closed at contacts 23 of switch 18 is open at contacts 15 of load responsive switch 10.

Actuating windings 19, 26, and 30 of the switch means 17, 18 and 27 respectively are, therefore, all in deenergized condition, the carrier-current control transmitter system is in shut down condition, and no carrier-current is being transmitted to the line 1 from the generating means 2. The illustrated shut down condition of the carrier-current transmitter apparatus persists as long as the overload or heavy load condition obtains on the line 1.

Assuming now that the load on line 1 decreases to a predetermined underload value, then in response to the underload condition on line 1 the underload contacts 15 of load responsive switch means 10 are caused to close and the overload or heavy load contacts 14 are opened. The actuating winding 30 of switch 27 is energized through contacts 15 of switch 10 and contacts 23 of switch 18 as soon as the load responsive switch 10 is actuated to the underload position, but the energizing of actuating windings 19 and 26 of switches 17 and 18 is prevented until the time switch 27, after the energizing of its actuating winding 30, operates to reverse its contacts. Preferably this delay period is relatively long, five minutes for example.

As soon as the contacts of switch 27 reverse, thereby opening contacts 28 and closing contacts 29, actuating windings 19 and 26 of switches 17 and 18 are energized through the contacts 29 of the switch 27 and contacts 23 of switch 18. Motor generator switch 17 is immediately operated to closed position by winding 19 to connect motor 3 to its current source and generator 7 to its coupling transformer 8. Approximately one second later, for example, the motor generator is up to speed and in operative condition and the transmission of a carrier current impulse on line 1 is initiated. After a relatively short time interval, ten seconds for example, time switch 18 operates to reverse its contacts thereby closing contacts 22 and opening contacts 23. Actuating winding 19 of motor generator switch 17 is then immediately deenergized, the motor generator is disconnected from the current source and also from the coupling transformer 8, and the transmission of the carrier-current impulse is stopped.

It will be understood that this relatively short carrier impulse, thus limited in the present case to a period of ten seconds, may be utilized by suitable impulse responsive means (not shown) on line 1 to turn on a heater (not shown) or other like load.

The carrier-current control system is now in underload shut down condition and remains in this condition, with contacts 21, 20, 23, 28 and 14 open and contacts 22, 29 and 15 closed, as long as the underload obtains on line 1.

Assuming that after a period of underload the load on line 1 increases to a predetermined value, corresponding to an overload or a relatively heavy load, then in response to the heavy load condition the overload or heavy load contacts 14 of load responsive switch means are caused to close and the underload contacts 15 are opened. Winding 30 of switch 27 is energized, through contacts 14 of switch 10 and contacts 22 of switch 18, immediately following actuation of switch 10 to the overload or heavy load position. Energizing of windings 19 and 26 is, however, prevented until time switch 27 operates to reverse its contacts, for example after the time period of five minutes.

Immediately following the reversal of switch 27 thereby opening contacts 29 and closing contacts 28, actuating windings 19 and 26 are energized through the contacts 28 of the switch 27 and contacts 22 of switch 18. The transmission of another carrier-current impulse from generator 7 on line 1 is then initiated, as hereinbefore described. After a time interval which, as before, may be relatively short but of a different length from the short impulse first mentioned, 39 seconds for example instead of ten seconds, time switch 18 operates to reverse its contacts thereby closing contacts 23 and opening contacts 22. Actuating winding 19 of motor generator switch 17 is again deenergized and transmission of the carrier-current impulse is stopped.

Similarly to the ten second impulse before mentioned, the second impulse, limited to a different period, as 39 seconds, may be utilized by suitable impulse responsive means to turn off the heater or like temporary load from line 1.

After the cycle of switching of the apparatus as above described the carrier-current control system is again in shutdown condition with the various switch means in their initial positions illustrated in the drawing. The described switching cycle of the apparatus may be repeated indefinitely in response to the recurring heavy load and underload conditions on the distribution line.

Referring to Fig. 2, the circuit elements and circuit arrangements of the carrier current system illustrated therein are the same as in the system of Fig. 1 except for the circuit connections of actuating windings 19, 26 and 30, and of contacts 14 and 15 of load responsive relay 10.

In Fig. 2, one of the circuits involving the actuating winding 30 of relay 10 includes current source lead 6, the winding 30, overload contacts 14 of relay 10, contacts 29 of relay 27 instead of contacts 22 of relay 18, and current source lead 5. The other circuit involving winding 30 includes lead 6, the winding 30, underload contacts 15 of relay 10, contacts 28 of relay 27 instead of contacts 23 of relay 18, and lead 5. The circuits involving the paralleled actuating windings 19 and 26, of switch 19 and relay 18 respectively, are the same as in the corresponding circuits of Fig. 1 except that in Fig. 2 the contacts 22 and 23 of relay 18 and contacts 28 and 29 of relay 27 are connected in a sequence different from the sequence in which they are connected in Fig. 1.

The switching cycle of the apparatus of Fig. 2 is substantially the same as set forth hereinabove in connection with the system of Fig. 1, the switching operations in the two systems differing only in that in the system of Fig. 2 actuating coil 30 of load responsive relay 10 is energized through the contacts of relay 27 instead of through the contacts of relay 18.

Referring to Fig. 3, in the system therein illustrated, in addition to the means hereinabove described for controlling off-peak loads on one distribution line, means are provided for controlling the loads on two such lines in succession. To supply carrier-current impulses to the second distribution line, a second transformer 34 and a motor generator switch means 35 having an actuating winding 36, contacts 37 for connecting the carrier current generator 7 to the transformer 34 and contacts 38 for connecting the motor 3 to its current source, are provided.

To control the initiation and time period of operation of the generating means 2 when supplying carrier current impulses to the second distribution line, a time switch 39 having contacts 40 and 41 and an actuating winding 42 is provided adapted to cooperate with actuating winding 36 of motor generator switch 35 in essentially the same manner that time delay relay 18 cooperates as hereinbefore described with actuating winding 19 of motor generator switch 17.

To delay the initiation of the supplying of carrier-current impulses to the second distribution line until, during a given cycle, the initiation and timing of a carrier-current impulse to the first distribution line has been accomplished, a switch means, as switch contacts 43, is provided adapted to be operated by the actuating coil 19 of motor generator switch 17. The switch means 43 is arranged to control the supply of operating current to actuating winding of motor generator switch 35 and actuating winding 42 of time switch 39.

In Fig. 3 the circuits involving actuating winding 30 of time switch 27, actuating winding 19 of motor-generator switch 17, and actuating winding 26 of time switch 18 are preferably the same as illustrated, for example, in the system of Fig. 2.

Referring to the circuits involving the actuating winding 36 of the motor generator switch 35, one of these circuits includes current source lead 6, switch contacts 43, the actuating winding 36, contacts 40 of time switch 39, contacts 29 of time switch 27, and current source lead 5. The other circuit includes current source lead 6, switch contacts 43, the actuating winding 36, contacts 41 of time switch 39, contacts 28 of time switch 27, and current source lead 5.

Referring to the circuits involving the actuating winding 42 of time switch 39, one of these circuits includes current source lead 6, switch contacts 43, the actuating winding 42, contacts 40 of time switch 39, contacts 29 of time switch 27, and current source lead 5. The other circuit includes current source lead 6, switch contacts 43, the actuating winding 42, contacts 41 of time switch 39, contacts 28 of time switch 27, and current source lead 5.

To energize the actuating winding 11 of switch or relay means 10 in accordance with load conditions on the distribution lines, a current transformer 44 associated with the connections to the distribution lines power source is preferably provided.

In operation of the system illustrated in Fig. 3, let it be assumed that the several switch means are initially in their illustrated positions, corresponding to a continuing condition of overload on the distribution lines. The illustrated shut down condition of the system of Fig. 3 persists during the continuance of the overload on the distribution lines.

Assuming that an underload now occurs on the distribution lines, load responsive switch 10 opens contacts 14 and closes contacts 15. At the end of a five minute period switch 27 opens contacts 28 and closes contacts 29, and actuating winding 19 is energized and closes motor generator switch contacts 20 and 21 thus starting the generation of carrier current impulses. After approximately one second the generator is up to speed and carrier-current impulses are impressed on the first distribution line through transformer 8. Simultaneously with the energizing of winding 19, winding 26 of time switch 18 is also energized. After a ten second period, the switch 18 operates to close contacts 22 and to open contacts 23, thus deenergizing winding 19.

At the instant winding 19 is deenergized, contacts 20 and 21 of switch 17 are opened. The opening of contacts 21 disconnects transformer 8 from the generator 7 and stops the impressing of carrier current impulses upon the first distribution line. Simultaneously with the opening of contacts 20 and 21 of the motor generator switch 17, the switch contacts 43 are operated to closed position since contacts 43 are also actuated by winding 19. Actuating winding 36 of the other motor generator switch 35, is then immediately energized, the circuit being from lead 6, through contacts 43, the winding 36, contacts 40 of time switch 39, and contacts 29 of switch 27, to lead 5. Contacts 37 and 38 of the motor generator switch 35 close, immediately reconnecting motor 3 to its power source and connecting generator 7 to the transformer 34 thereby initiating the supplying of carrier current to the second distribution line. After a time period of ten seconds, time switch 39 reverses its contacts, closing contacts 41 and opening contacts 40. Actuating winding 36 of motor generator switch 35 is then deenergized, causing contacts 38 and 37 to reopen to disconnect motor 3 from its current source and to disconnect generator 7 from the transformer 34, thereby stopping the supplying of carrier current to the second distribution line.

The entire current control system of Fig. 3 is now in the underload shut down condition. If after a period of underload an overload occurs on the distribution lines, the contacts 15 of load responsive switch 10 open and the contacts 14 close. After a time period of five minutes, time switch 27 reverses its contacts, opening the contacts 29 and closing the contacts 28. Actuating winding 19 of motor generator switch 17 and actuating winding 26 of time switch 18 are immediately energized. Contacts 20 and 21 of switch 17 are caused to close thereby initiating the impressing of carrier current on the first distribution line, and contacts 43 are caused to open thereby preventing the energizing of actuating winding 36 of switch 35 and preventing the supplying of carrier current to the second distribiution lines.

After a time period of thirty-nine seconds, time switch 18 reverses its contacts, closing the contacts 23 and opening the contacts 22. Actuating winding 19 of switch 17 is immediately deenergized, switch 17 opens thereby stopping the impressing of carrier current upon the first distribution line, and contacts 43 are caused to close. Upon the closing of contacts 43, actuating winding 36 of switch 35 is energized, and contacts 38 and 37 close thereby initiating the impressing of carrier-current upon the second distribution line. After a time period of thirty-nine seconds, time switch 39 reverses its contacts, closing contacts 40 and opening contacts 41, thus deenergizing the actuating winding 36 of switch 35 and thereby stopping the impressing of carrier-current upon the second distribution line. The entire system of Fig. 3 is now in overload shutdown condition, with the various parts of the apparatus again in their illustrated positions.

It will be apparent that the circuit arrangement of Fig. 3 may be readily expanded to permit energizing not only of two distribution lines as shown but of any desired number of distribution lines or feeders in succession.

It will be noted that in the hereinabove described carrier-current control transmitter systems in accordance with my invention, instantaneous initiation, by a load responsive means in cooperation with a time switch means, of the "on" and "off" operations of the system at the different load levels in the distribution lines is prevented, by the action of additional time switch means, thereby preventing unnecessary and undesirable operations of the equipment due to rapid fluctuations of the distribution line load.

My invention has been described herein in particular embodiments for purposes of illustration. It will be understood, however, that the invention is susceptible of various changes and modifications and that by the appended claims I intend to cover any such modifications as fall within the true spirit and scope of my invention.

What I claim as new and desire to secure by Letters Patent of the United States, is:

1. In an electric system including means for generating carrier-current and for impressing said carrier-current on an electric line, switch means adapted to initiate operation of said generating means for predetermined time intervals in response to a change in load condition on said line, and switch means adapted to prevent said initiation of operation of said generating means by said first-named switch means until after a predetermined time interval following said change in load condition.

2. In a carrier current system including an electric line and means for generating said current and for impressing said current upon said line, switch means responsive to a load condition on said line, switch means adapted in cooperation with said load responsive switch means to initiate operation of said generating means and to stop said operation after predetermined time intervals, and switch means operatively associated with said load responsive switch means to prevent said initiation of operation of said generating means by said second-named switch means until after a predetermined time interval.

3. In a system for impressing carrier-current on an electric line, means for generating said carrier-current, a current source, switch means responsive to a load condition on said line, switch means adapted in cooperation with said load responsive switch means to be energized from said source to initiate operation of said generating means and to stop said operation after predetermined time intervals, and switch means adapted to be energized from said source through said load responsive switch means to prevent said initiation of operation of said generating means by said second-named switch means until after a predetermined time interval.

4. In a carrier current system including an electric line and means for generating said current and for impressing said current upon said line, switch means responsive to underload conditions and to heavy load conditions on said line, switch means adapted in cooperation with said load responsive switch means to initiate operation of said generating means and to stop said operation after different predetermined time intervals under said underload and heavy load conditions respectively, and switch means operatively associated with said load responsive switch means to prevent said initiation of operation of said generating means by said second-named switch means until after a predetermined time interval.

5. In a carrier current system including an electric line and means for generating said current and for impressing said current upon said line, switch means responsive to a load condition on said line, a current source, switch means adapted to be energized from said source through said load responsive switch means to connect said generating means to said source and to disconnect said generating means from said source after a predetermined time interval, and switch means adapted to be energized from said source through said load responsive switch means to prevent said connecting of said generating means to said source by said second-named switch means until after a predetermined time interval.

6. A carrier-current system including at least two electric distribution lines, means for generating said carrier-current, means for impressing said current upon said lines, switch means responsive to a load condition on said lines, switch means adapted in cooperation with said load responsive means to initiate and to time the supplying of carrier-current from said generating means to said distribution lines in succession, and switch means operatively associated with said load responsive switch means to prevent said initiation and timing of the supplying of carrier current until after a predetermined time interval.

JOHN L. WOODWORTH